United States Patent [19]
Mattera

[11] 3,870,893
[45] Mar. 11, 1975

[54] WAVE OPERATED POWER PLANT
[76] Inventor: Henry A. Mattera, 736 Fern St., Yeadon, Pa. 19050
[22] Filed: Oct. 15, 1973
[21] Appl. No.: 406,545

[52] U.S. Cl. .................................. 290/53, 290/42
[51] Int. Cl. ........................................ F03b 13/12
[58] Field of Search .................. 290/53, 54, 43, 44; 417/330, 331, 332, 333, 334, 335, 336, 337

[56] References Cited
UNITED STATES PATENTS
| | | | |
|---|---|---|---|
| 1,448,029 | 3/1923 | Larry et al. | 290/53 |
| 3,064,137 | 11/1962 | Corbett et al. | 290/53 |
| 3,200,255 | 8/1965 | Masuda | 290/53 |

Primary Examiner—G. R. Simmons
Attorney, Agent, or Firm—Zachary T. Wobensmith, 2nd; Zachary T. Wobensmith, III

[57] ABSTRACT

A wave operated power plant is described wherein a buoyant vessel is anchored on the ocean surface with the wave motion forcing ocean water up through vertical pipes in the hull causing rotation of blades in the pipes thereby through shafts rotating electrical generators and generating electricity, the water exhausted from the tubes being discharged onto a deck above the ends of the pipes and to the ocean.

4 Claims, 3 Drawing Figures

PATENTED MAR 11 1975 3,870,893

3,870,893

WAVE OPERATED POWER PLANT

BACKGROUND OF THE INVENTION

1. Field of the Invention

This invention relates to power plants in which impelling of ocean water upwardly by wave motion through pipes in a buoyant vessel is used to rotate blades to thereby drive electric generators and produce electricity.

2. Description of the Prior Art

The use of wave motion of large bodies of water for generation of electricity has been tried by many persons over some period of time.

The U.S. Pat. to Corbett, Jr., et al No. 3,064,137 illustrates a buoy including a plenum chamber with wave motion causing air to flow therefrom through a standpipe rotating blades and operating a generator.

The U.S. Pat. to Masuda, No. 3,200,255 illustrates a buoy that is anchored offshore with an air pipe connected to open air through the vanes of a turbine and to an air pump room. The force of the waves causes the buoy to ride up and down thereby compressing the air in the pump room and rotating the turbine blade to drive an electric generator.

These previously available structures use air as an impelling medium which medium is unsatisfactory due to losses in compression and the forces needed to compress the air need to be of large magnitude.

None of the available structures contemplates my structure wherein water supporting a buoyant vessel is impelled upwardly in vertical pipes to drive blades which in turn drive electric generators.

SUMMARY OF THE INVENTION

In accordance with the invention a wave operated power plant is provided wherein the upward movement of water within a pipe carried in a vessel causes blades to rotate an electric generator in response to waves raising and lowering the vessel.

The principal object of the invention is to provide a wave operated power plant which is simple in construction and requires little maintenance.

A further object of the invention is to provide a wave operated power plant that can be used in series with like power plants.

A further object of the invention is to provide a wave operated power plant which is suitable for use in all the oceans of the world.

A further object of the invention is to provide a wave operated power plant which is driven by a positive medium with little or no wasted energy.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figure 1:
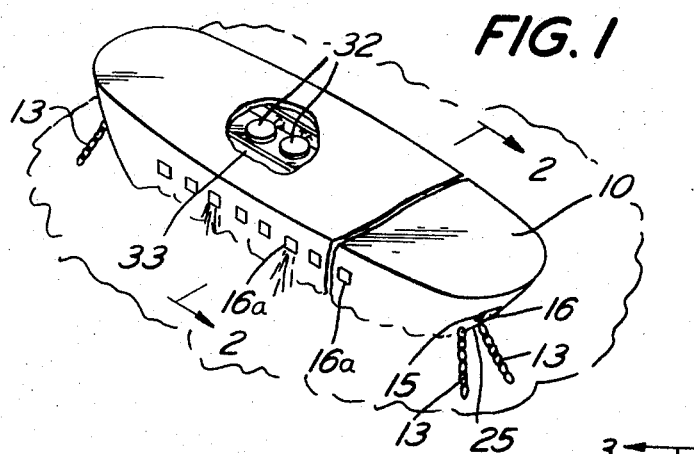
FIG. 1 is a perspective view of a vessel incorporating the apparatus of the invention and partially broken away to show the interior construction.
Figure 2:
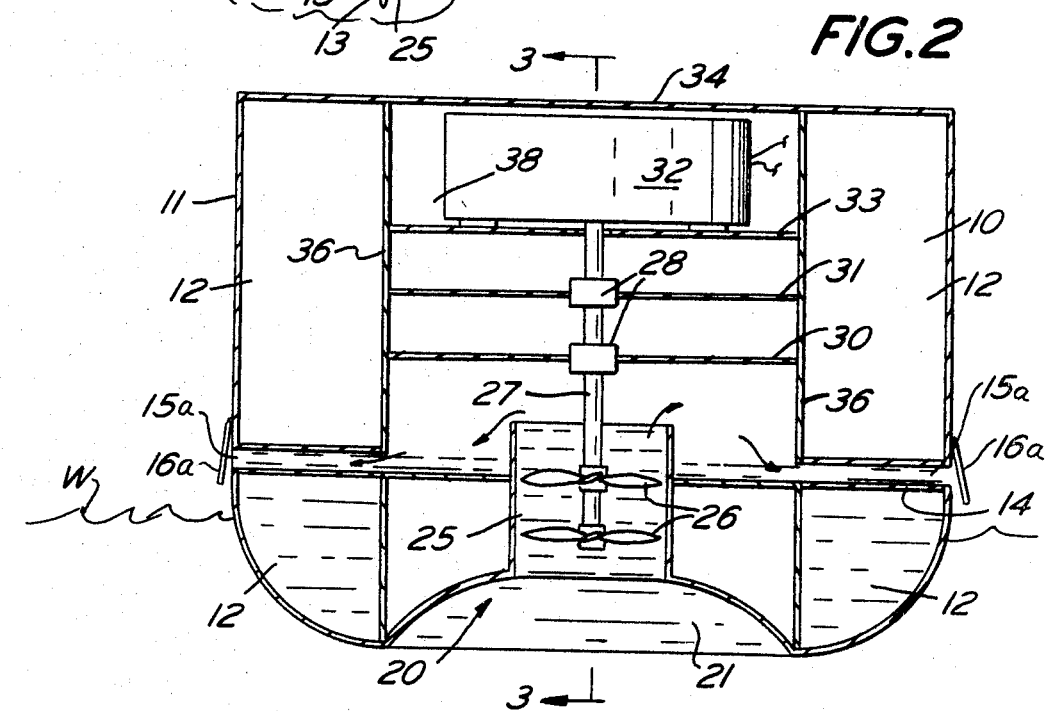
FIG. 2 is a vertical sectional view, enlarged, taken approximately on the line 2—2 of FIG. 1.
Figure 3:
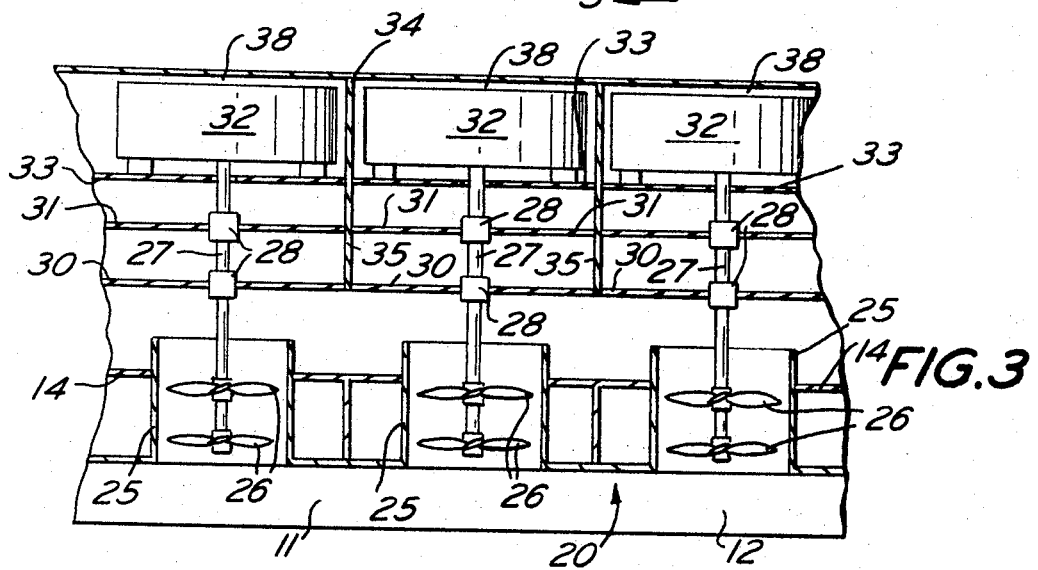
FIG. 3 is a fragmentary, vertical longitudinal sectional view taken approximately on the line 3—3 of FIG. 2.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the wave operated power plant comprises a vessel having a hull 10 of conventional shape provided with an outer watertight skin 11. The vessel hull 10 is shown as floating on a body of water subject to substantially continuous wave motion, preferably ocean water with a water line W on the hull 10. The vessel is anchored by lines 13 to the ocean floor or to a reef so that it will react to wave motion.

The hull 10 has a plurality of separated flotation and ballast chambers 12 therein which are watertight and provide a selective flotation level and buoyancy to the hull by the addition or subtraction of ballast therefrom. The hull 10 has a water deck 14 which is located within the hull at a location approximately one foot above the water line. Water therein can be discharged or returned to the main body of water in any desired manner. One suitable arrangement comprises an exit port 15 at the rear of the deck 14 equipped with a trap door 16 to permit water to flow out of the port 15 into the body of water surrounding the hull 10 but to prevent any return flow. Exit ports 15a with trap doors 16a can be provided alone the sides of the hull 10.

A trough 20 is provided on the underside of the hull 10 open at the front, running the length of the hull and has a trap door 21 opening rearwardly to permit water to exit when there is no back pressure.

Along the length of the trough 20 and in the center line of the hull 10, spaced tubes 25 are provided extending vertically upwardly with termination just above the water deck 14.

Within the tubes 25 and below the level of the water deck 14 each tube has a set of turbine blades 26 therein carried on a shaft 27. The shafts 27 are rotatably mounted in bearings 28 secured between and to decks 30 and 31 which are located above water deck 14 and connected to the hull 10.

The shafts 27 are connected to slow speed generators 32 mounted to deck 33 and below a top deck 34 which closes the vessel at the top.

The tubes 25 are separated from each other by vertical walls 35 extending transversely across the hull 10 which with longitudinal walls 36 form compartments 38 for each tube 25 and generator 32.

The generators 32, if located in a hull 10 of 300 or more feet in length, could be 20 in number with a total production capacity of approximately 10,000 kilowatts.

It should be noted that for optimum operation the hull 10 should be anchored at least one mile from shore facing into the prevailing direction of wave flow where it is free to be moved by waves and ground swells coming from any direction.

In operation, when the vessel is moved by waves or ground swells water is forced upwardly in tubes 25 rotating the blades 26, shafts 27 and generators 32 with the water exiting onto deck 14 and out ports 15 and/or 15a and providing electricity for use as desired.

If desired a string of hulls can be anchored together so as to provide a dependable maintenance free power generation station free from pollution of the waters and providing electricity at a low cost without diminution of scarce energy resources.

I claim:

1. A wave operated power plant which comprises
a vessel having a hull,
a plurality of flotation and ballast chambers carried within said hull,
at least one vertically extending tube extending upwardly from the bottom of said hull,
water deck means contiguous to the hull water line above which said tube terminates,
a discharge passageway being provided for discharge of water from said water deck means,
said passageway having at least one port extending through said hull and having an outwardly opening door for permitting water discharge but preventing entry of water from outside said hull,
water driven members in each said tube having an output shaft, and
electric generator means connected to each shaft.

2. A wave operated power plant as defined in claim 1 in which
a water trough is provided along the bottom of said hull with which the lower end of said tube is in communication.

3. A wave operated power plant as defined in claim 2 in which
said trough is centrally located on the underside of said hull.

4. A wave operated power plant as defined in claim 3 in which
said trough runs substantially the length of said vessel.

* * * * *